United States Patent

Anders

[15] 3,638,764
[45] Feb. 1, 1972

[54] BRAKESHOE FOR SPOT-TYPE DISC BRAKES

[72] Inventor: Hans Joachim Anders, Frankfurt, am Main, Germany

[73] Assignee: International Telephone and Telegraph Corporation, New York

[22] Filed: Apr. 23, 1970

[21] Appl. No.: 31,274

[30] Foreign Application Priority Data

Apr. 23, 1969  Germany .................. P 19 20 582.4

[52] U.S. Cl. ......................... 188/73.1, 188/1 A, 188/250 B
[51] Int. Cl. ........................................................ F16d 66/02
[58] Field of Search .................... 188/1 A, 73.1, 250 B, 72.4, 188/72.5

[56] References Cited

UNITED STATES PATENTS 3,368,519   2/1968   Ruda ..................................... 116/67

FOREIGN PATENTS OR APPLICATIONS 1,575,898   3/1967   Germany ........................... 188/250 B Primary Examiner—George E. A. Halvosa
Attorney—C. Cornell Remsen, Jr., Walter J. Baum and Paul W. Hemminger

[57] ABSTRACT

A spot-type disc brakeshoe having a brake lining and a backing plate with the backing plate having lateral lugs, at least one of which is bent toward the brake disc while the others are chamfered to form an acute angle with respect to the actuator piston whereby the brakeshoe will rotate thereby creating an audible signal when the brake lining is worn down and the bent lug contacts the brake disc.

4 Claims, 1 Drawing Figure

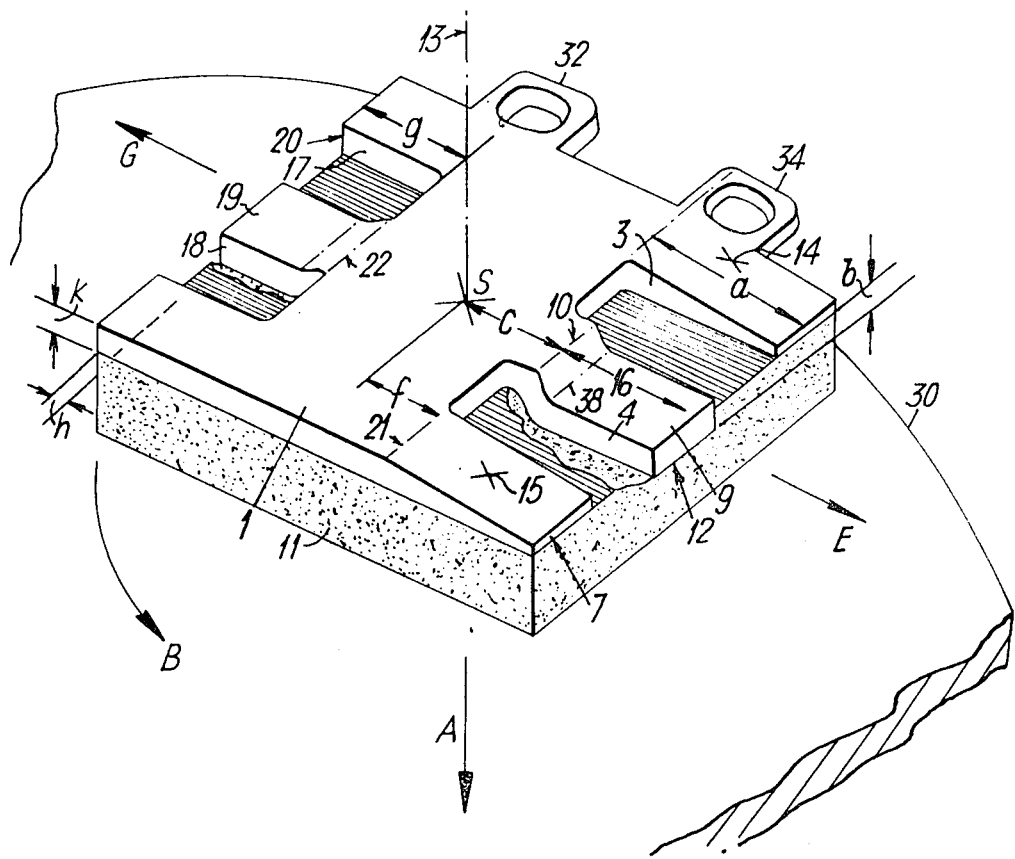

BRAKESHOE FOR SPOT-TYPE DISC BRAKES

CROSS-REFERENCE TO RELATED APPLICATION

This application is filed under the provisions of 35 U.S.C. 119 with a claim for the benefit of the filing date of an application covering the same invention filed on Apr. 23, 1969, Ser. No. P 19 20 582.4 in the Federal Republic of Germany.

BACKGROUND OF THE INVENTION

This invention relates to spot-type disc brakeshoes consisting of a brake lining and a backing plate.

In disc brakes for automobiles it is desirable to provide some means for automatically alerting the driver when the brake linings become worn to the extent that they should be replaced, and my copending application, Ser. No. 782,849, filed on Dec. 11, 1968, now U.S. Pat. No. 3,566,995, discloses one means for providing an audible signal when the linings become worn out and need replacement.

The present invention is an improvement of this invention.

SUMMARY OF THE INVENTION

It is an object of this invention to provide brakeshoes for spot-type disc brakes which ensure even wear over the total surface of the linings without brake squealing and which provides an audible signal when the brake linings are worn to the extent that they require replacement.

It is another object of this invention to provide brakeshoes for spot-type disc brakes which provide an audible signal when the linings are worn and which are inexpensive to manufacture and which do not require precise machining and close tolerance control of the component parts.

It is a further object of this invention to provide a backing plate for spot-type disc brakeshoes which is made from a relatively thin sheet metal and which provides the same torque resisting thickness on the side of the backing plate as prior backing plates made from much thicker stock to ensure that the backing plate does not lose contact with the necessary guiding and supporting surfaces as the linings wear.

The present invention achieves these objects by means of a brakeshoe with a backing plate having recesses in the lateral supporting surfaces forming lugs therebetween with one or more of the lugs bent toward the brake disc in the area of the friction surface of the lining material while the remaining lugs on the same side of the backing plate are chamfered toward their ends to form an acute angle with the pressure member which acts against the backing plate. The inclination of the lugs begins at a distance $f$ from the center of gravity S of the brakeshoe, S being located in the axis of the pressure member.

BRIEF DESCRIPTION OF THE DRAWING

The drawing is a perspective view of a spot-type disc brake lining with backing plate embodying this invention.

DESCRIPTION OF THE SPECIFIC EMBODIMENT

The brakeshoe shown in the drawing is adapted for use in spot-type disc brakes, the brakeshoe comprising a backing plate 1 and lining or braking material 11 bonded to the backing plate. The underside of the lining material shown in the drawing lies adjacent to the rotatable disc 30 which is to be braked. The support and guide structure for the brake shoe as well as the construction of the rest of the disc brake assembly and actuator are well known and therefore are not described in detail herein. These details can be found in any number of patents of which U.S. Pat. Nos. 3,478,844; 3,476,222; and 3,371,753, are representative. The brakeshoe is supported in a radial direction with respect to the disc by means of the lugs 32 and 34 on the backing plate which are provided with holes through which guide pins pass. The holes in the guide lugs are elongated somewhat to allow the brakeshoe to rotate about a radial axis. The brakeshoes are prevented from rotating with the disc by means of guide walls in the housing which abut against the supporting edges 7 and 20 of the brakeshoe. An actuator such as a piston acts against the top surface of the backing plate 1 to press the lining material against the rotating disc, all of which is well known in the prior art.

In accordance with my invention, the backing plate 1 has lateral recesses 3, 4, 17 and 18 which are cut out of the supporting edges 7 and 20 to the extent shown in the drawing, thus forming three lugs on each side of the backing plate. The center lug 9 on one side is given a double or dogleg bend at the lines 10 and 38 so that the lug lies closer to the disc and in a plane parallel to the backing plate. In this way the underside of the lug will be below the underside of the backing plate by an amount $b$ shown in the drawing. The lugs on either side of the lug 9 are chamfered for the length $a$ so that they form an acute angle with respect to the piston or other actuator which moves along the axis 13.

The lug 19 on the other side of the brakeshoe is bent in a manner similar to the lug 9 and extends a somewhat smaller distance $h$ toward the brake disc. The lining material 11 which is bonded to the underside of the backing plate has a smooth flat friction surface parallel to the backing plate 1.

As the lining material wears down, a condition is reached where the lug 9 and its lateral edge 12 contact the brake disc during braking. Due to the lever arm formed by the lug with respect to the point at which the pressure is applied to the backing plate, the brakeshoe consisting of parts 1 and 11 tilts in the direction of arrow B around the line 10 creating a distinctive and easily noticed noise when the brakes are applied thereby indicating to the driver that it is necessary to have the brake linings replaced.

Due to the bending of the lugs 9 and 19, the effective thickness of the backing plate which is available to provide support for transmitting torque to the housing which guides the brakeshoe is increased and therefore a relatively thin sheet metal can be used for the backing plate.

I claim as my invention:

1. A spot-type disc brakeshoe having a carrier plate and a friction lining bonded to said carrier plate, said carrier plate and lining being disposed parallel to and capable of engaging a brake disc comprising:
   a pair of recesses formed in each of the leading and trailing edges of said carrier plate to form three lugs in each of said edges of said carrier plate extending inwardly a given distance from their associated one of said edges of said carrier plate;
   at least one surface of the two outside lugs in both edges of said carrier plate being parallel to said disc and in the plane of said carrier plate;
   the center lug in both edges of said carrier plate having a double bend therein, one bend being toward said disc and the other bend being to dispose the end of said lug in a given plane parallel to said disc between the plane of said disc and the plane of said carrier plate, said given plane of one of said center lugs being closer to said disc than said given plane of the other of said center lugs so that upon excessive wear of said lining said one of said center lugs contacts said disc during braking and tilts said carrier plate and said lining toward said disc to create a distinctive noise to warn a driver of excessive wear of said lining.

2. A brakeshoe according to claim 1, wherein said outside lugs associated with said one of said center lugs are tapered toward their associated one of said edges to form an acute angle with the plane of said carrier plate.

3. A brakeshoe according to claim 2, wherein: each of said tapered outside lugs are formed by grinding a chamfer on the surface of said carrier plate opposite said lining, the length of said chamfer being equal to the length of said center lugs.

4. A brakeshoe according to claim 3, wherein said carrier plate is formed from sheet metal having a thickness less than the thickness of usual carrier plates used in this type of brake due to said bending of said center lugs.

* * * * *